UNITED STATES PATENT OFFICE.

WLLIAM ANSYL PHILLIPS, OF ST. LOUIS, MISSOURI, ASSIGNOR, BY DIRECT AND MESNE ASSIGNMENTS, TO RHEOLITE COMPANY, OF MILWAUKEE, WISCONSIN, A CORPORATION OF WISCONSIN.

COMPOSITION OF MATTER AND THE METHOD OF MAKING THE SAME.

933,722. Specification of Letters Patent. Patented Sept. 7, 1909.

No Drawing. Application filed February 20, 1906. Serial No. 302,122.

*To all whom it may concern:*

Be it known that I, WILLIAM ANSYL PHILLIPS, a citizen of the United States, residing at St. Louis, in the State of Missouri, have invented a certain new and useful Composition of Matter and the Method of Making the Same, of which the following is a full, clear, and exact specification.

This invention relates to a composition of matter and its method of production, more especially designed for use as an electric conductor where conductors of high resistance are required, as, for example, in resistance boxes for rheostats, electric heaters, etc., and the invention has for its primary object to provide an improved composition of matter of the described character which will be efficient and lasting.

Another object of the invention is to provide an improved composition of matter of the described character which will be practically indestructible by the electric current.

With these ends in view, the invention consists in certain features of novelty, which will now be fully described, and then more particularly pointed out in the claims.

This improved composition of matter consists primarily of asbestos or any of its equivalents, such as amphibole or hornblende serpentine asbestos, amianthus or Canadian chrysolite, actinolite or horn-blende rock, and suitable electrical conducting medium or metal united therewith.

Asbestos occurs in nature in a variety of forms or states of mechanical sub-division, namely, fibrous asbestos, powder or flour of asbestos, and asbestos sand, any one or all of which may be used in this invention as the resistance medium, but for the sake of economy the sand or the flour of asbestos—which are practically waste products—are preferably employed.

For the electrical conducting element or medium, any metal, such as iron in any of its various forms, nickel, cobalt, or other metals, but preferably cast-iron, or crude iron in a finely divided state, is employed.

In producing the improved product of this invention, these two main elements—namely, the resistance medium and the conducting medium—are vitrified in the presence of each other. This may be done with varying results by either of two methods, namely, fusion at a high degree of heat, or vitrification at a much lower degree of heat, arrived at gradually.

When the slow baking process of vitrification is to be employed, it becomes necessary or desirable to add to the two principal elements above named some suitable bond or flux, such as liquid-glass and water. In proceeding according to this latter method, the iron or other conducting medium is pulverized sufficiently to pass through a 200 mesh sieve, and two units, by weight, of this should then be added to about 1¾ units, by weight, of any of the afore-named resistance media, but preferably flour of asbestos. These are then thoroughly mixed in a mechanical mixer or triturator, and the mass is moistened with the liquid glass sufficiently to make it homogeneous, or hold together, after being pressed into the shape which it is desired the resistance conductor shall assume in its finished form. The substance may be thus formed into shape in any suitable way, as by molding in molds, or by hand. When the form is removed from the mold it is dried and baked, first at a low temperature, and then raised to a dull red glow, and kept in that condition for about four hours, when it is allowed to cool and will be ready for use.

This composition before it is baked is of an exceedingly high resistance, and is practically an insulator of electricity, when baked for an hour, at a dull red heat, its conducting power is increased and continues to increase up to four to six hours of baking, depending upon the size of the cross section of the material, and yet it is found that by prolonging the baking operation its resistance is very materially increased, and in fact, increases with the duration of the baking operation up to a certain temperature, when it begins to decrease again, as will be presently described. For example, a piece of the material, made as above described and baked about four hours, measuring approximately 9 inches in length by 5/16 of an inch square in cross area, in a 110 volt light circuit, the light will be more or less dimmed but not extinguished; whereas if the same piece of resistance be baked as before described for a period of six hours, the light will be entirely extinguished, and if baked ten hours at a dull red heat its resistance will be so materially increased that a 250 volt current would be reduced to six volts by 36 inches of the same cross area. The duration of use, however, of the material, under normal conditions, does not change its properties in the least, assuming that the use does not result in making the material red hot. Should it be desired to increase the resistance, it is simply necessary to increase the proportion of asbestos, or electrical resistance medium, employed in the compound.

If the two principal elements of the composition are to be vitrified or fused by the high temperature method before mentioned, the resisting medium or media and the iron or other conducting medium or media, prepared as before described, and in substantially the proportions specified, are heated until the silicious materials in the asbestos fuse or melt, when the heat may be checked, and the resulting substance will be in the nature of a vitrified mass, or both the materials may be fused in the presence of each other by the electric arc, or any other means of producing the fusing degree of heat, and while the mass is in this fused and fluid condition it is run into suitable molds, or otherwise given the shape which it is desired it shall possess while in use. By thus subjecting the conducting medium or iron and the resisting medium or asbestos to this high degree of heat, the two elements are caused to boil or fuse and run together in a molten mass, producing a homogeneous body in which the original identity of the two ingredients is apparently lost. This latter method also very materially increases the resisting property of the substance, and for some purposes it is preferable, when prepared in this way, to the other form, as it is less fragile, and is capable of being subjected to a very high degree of heat without material deterioration in its resisting properties, and therefore constitutes an admirable resistance for electric heaters and the like. In preparing the substance according to this latter method, the flux or water-glass, used as a bond in the other form, is not necessary, as the particles of the two main ingredients are bonded together by fusion and become homogeneous. The electrical conductivity of an electrical resistance conductor thus made is increased in proportion to the degree of heat to which it is subjected. That is to say, taking a resistance made of this material in its cold state, after it has been fused and allowed to cool off, it possesses a higher resistance than when it becomes subsequently heated; and it is also found that the resistance of a piece of the material of a given length is affected in but a slight degree by variations in the cross section. This improved substance also possesses the characteristic of being capable of being subjected to a high degree of heat for practically an indefinite length of time without deterioration. Another important distinction between a resistance member composed of this composition and an ordinary conductor utilized as a resistance member, is, that with the latter the resistance gradually increases in proportion to the increase in the heat of the conductor, whereas with the former the reverse is true, and the resistance or conductivity becomes uniform when the material attains the maximum degree of heat.

I claim:

1. The herein described composition of matter, containing an electrical resistance medium and an electrical conducting medium commingled and bonded together by fusion.

2. The herein described composition of matter, containing asbestos and an electrical conducting medium commingled and bonded together by fusion.

3. The herein described composition of matter, containing asbestos and an electrical conducting medium in a state of vitrification.

4. The herein described composition of matter, containing asbestos and a metal intimately commingled and fused together.

5. The herein described composition of matter, containing asbestos and iron intimately commingled and fused together.

6. The herein described composition of matter, containing asbestos and a metal united by fusion.

7. The herein described composition of matter, containing asbestos and iron fused together.

8. The herein described method, which consists in mixing asbestos with a metal and subjecting the same to a degree of heat sufficient to vitrify the silicious materials in the asbestos.

9. The herein described method, which consists in mixing asbestos with a metal and subjecting the same to vitrification until both the asbestos and the metal fuse in the presence of each other.

In testimony whereof I have signed my name to this specification, in the presence of two subscribing witnesses, on this 17th day of February, A. D. 1906.

WILLIAM ANSYL PHILLIPS.

Witnesses:
F. A. HOPKINS,
WM. LIONEL HANKS.